(12) United States Patent
Yao et al.

(10) Patent No.: US 7,486,891 B1
(45) Date of Patent: Feb. 3, 2009

(54) MULTI-PORT HIGH ISOLATION FILTERS

(75) Inventors: Li Yao, Fremont, CA (US); Daoyi Wang, Sunnyvale, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 544 days.

(21) Appl. No.: 11/244,591

(22) Filed: Oct. 6, 2005

(51) Int. Cl.
*H04J 14/02* (2006.01)
*G02B 6/28* (2006.01)
*G02B 6/32* (2006.01)

(52) U.S. Cl. .............................. 398/85; 385/24; 385/34; 398/79

(58) Field of Classification Search ................ 359/634; 385/24, 14, 31, 34; 398/79, 85

See application file for complete search history.

(56) References Cited

U.S. PATENT DOCUMENTS 5,818,986 A * 10/1998 Asawa et al. ................... 385/24
6,856,722 B2 * 2/2005 Sasaki et al. ................... 385/24

* cited by examiner

*Primary Examiner*—William C Choi
*Assistant Examiner*—Jack Dinh
(74) *Attorney, Agent, or Firm*—Joe Zheng (57) ABSTRACT

Techniques for designing optical devices with high isolation are disclosed. The high isolation is achieved by causing a reflected light signal to go through another filter. According to one embodiment, an optical apparatus comprises a first optical filter configured to transmit a first selected wavelength and reflect all other wavelengths, a second optical filter the second optical filter configured to transmit a second selected wavelength and reflect all other wavelengths. The first optical filter, being not perfect and producing a reflected signal with a residual of a signal at the first selected wavelength, the residual of the signal is minimized by the second optical filter when the reflected signal is impinged upon the second optical filter.

8 Claims, 7 Drawing Sheets

FIG. 1A

Prior art

FIG. 1B

Prior art

Prior art

FIG. 1E

Prior art

FIG. 2A

| 1550nm | 40 dB | 40 dB |
| 60 dB | 1490nm | 45 dB |
| 15 dB | 15 dB | 1310nm |

*FIG. 2B*

| Against Port \ Port | 1 | 2 | 3 | N |
|---|---|---|---|---|
| 1 | N/A | $I_{T1,12}$ | $I_{T1,13}$ | $I_{T1,1N}$ |
| 2 | $I_{T2,21} + I_{R1,21}$ | N/A | $I_{T2,23} + I_{R1,23}$ | $I_{T2,2N} + I_{R1,2N}$ |
| 3 | $I_{T3,31} + I_{R2,31} + I_{R1,31}$ | $I_{T3,31} + I_{R2,32} + I_{R1,32}$ | N/A | $I_{T3,3N} + I_{R2,3N} + I_{R1,3N}$ |
| N | $I_{TN,N1} + I_{RN-1,N1} + \ldots + I_{R1,N1}$ | $I_{TN,N2} + I_{RN-1,N3} + \ldots + I_{R1,N2}$ | $I_{TN,N3} + I_{RN-1,N3} + \ldots + I_{R1,N3}$ | N/A |

*FIG. 3B*

MULTI-PORT HIGH ISOLATION FILTERS

BACKGROUND OF THE INVENTION

1. Field of the Invention

The invention is generally related to the area of optical communications. In particular, the present invention is related to optical wavelength multiplexing or add/drop devices with high reflection channel isolation and the method for making the same in compact size.

2. The Background of Related Art

The future communication networks demand ever increasing bandwidths and flexibility to different communication protocols. Fiber optic networks are becoming increasingly popular for data transmission due to their high speed and high capacity capabilities. Wavelength division multiplexing (WDM) is an exemplary technology that puts data from different sources together on an optical fiber with each signal carried at the same time on its own separate light wavelength. Using the WDM system, up to 80 (and theoretically more) separate wavelengths or channels of data can be multiplexed into a light stream transmitted on a single optical fiber. To take the benefits and advantages offered by the WDM system, there require many sophisticated optical network elements.

Optical add/drop and multiplexer/demultiplexer devices are those elements often used in optical systems and networks. For example, an exchanging of data signals involves the exchanging of matching wavelengths from two different sources within an optical network. In other words, an add/drop device can be advantageously used for the multi-channel signal for dropping a wavelength while simultaneously adding a channel with a matching wavelength at the same network node. Likewise, for transmission through a single fiber, a plurality of channel signals are combined via a multiplexer to be a multiplexed signal that eventually separated or demultiplexed via a demultiplexer.

Figure 1A:
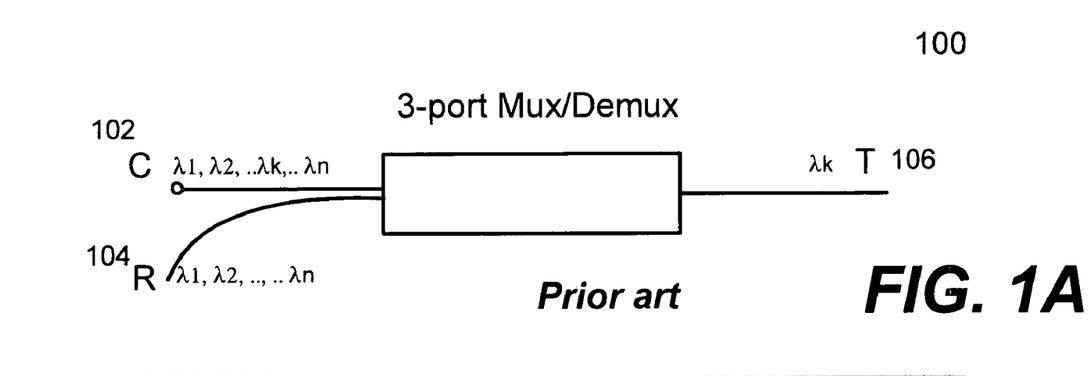
FIG. 1A shows a typical design of a three-port add/drop device.

A fundamental element in add/drop devices and multiplexer/demultiplexer is what is called a three-port device. As the name suggests, a three-port device has three ports, each for a multi-channel signal, a dropped or added signal or a multi-channel signal without the dropped or added signal. FIG. 1A shows a typical design of a three-port add/drop device 100. The optical device 100 includes a common (C) port 102, a reflection (R) port 104, and a transmission (T) port 106. When the device 100 is used as a multiplexer (i.e., to add a signal at a selected wavelength $\lambda_K$ to other signals at wavelengths other than the selected wavelength $\lambda_K$), the T-port 106 receives a light beam at the selected wavelength % K that is to be multiplexed into a group of beams at wavelengths $\lambda_1$, $\lambda_2$, ... $\lambda_N$ excluding the selected wavelength $\lambda_K$ coupled in from the C-port 102. The R-port 104 subsequently produces a multiplexed signal including all wavelengths $\lambda_1$, $\lambda_2$, ... $\lambda_K$, ... $\lambda_N$.

Likewise, when the optical device 100 is used to demultiplex signals, the C-port 102 receives a group of signals with wavelengths $\lambda_1$, $\lambda_2$, ... $\lambda_K$, ... $\lambda_N$. The T-port 106 produces a signal with the selected wavelength $\lambda_K$ while the R-port 104 subsequently produces a group of signals including all wavelengths $\lambda_1$, $\lambda_2$, ... $\lambda_N$ except for the selected wavelength $\lambda_x$. In general, the optical paths towards a R-port and a T-port are referred to as R-channel and T-channel, respectively.

Figure 1B:
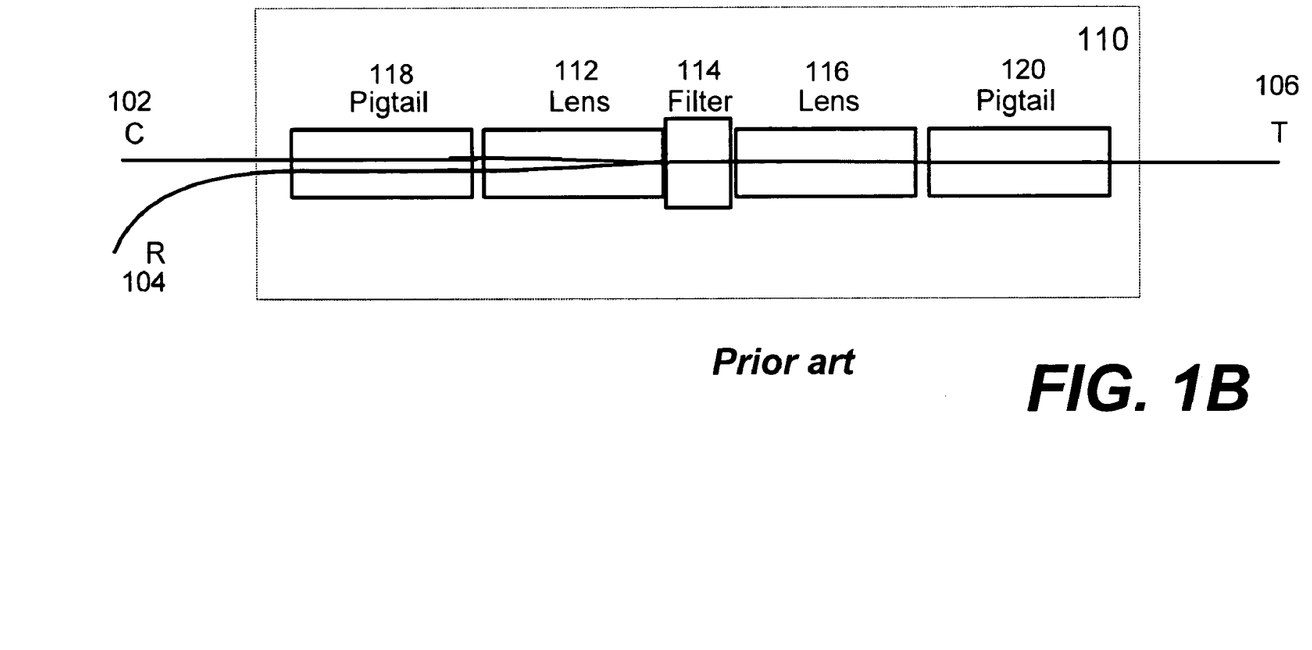
FIG. 1B shows an exemplary internal configuration of the optical device of FIG. 1A.

FIG. 1B shows an exemplary internal configuration 110 of the optical device 100 of FIG. 1A. As shown in FIG. 1B, there is a first GRIN lens 112, an optical filter 114 (e.g., a multilayer thin film filter) and a second GRIN lens 116. In general, a dual-fiber pigtail is provided in a holder 118 (e.g., a dual-fiber pigtail collimator) and coupled to or positioned towards the first GRIN lens 112, and a single-fiber pigtail is provided in a second holder 120 and coupled to or positioned towards the second GRIN lens 116. Essentially the two GRIN lenses 112 and 116 accomplish the collimating means for coupling an optical signal with multi channels or wavelengths in and out of the C port 102, the R port 104, or the T port 106. In general, the three-port device 100 is known to have a very low coupling loss from the C-port to both the R-port and the T-port for use as a demultiplexing device, or vise versa as a multiplexing device.

Figure 1C:
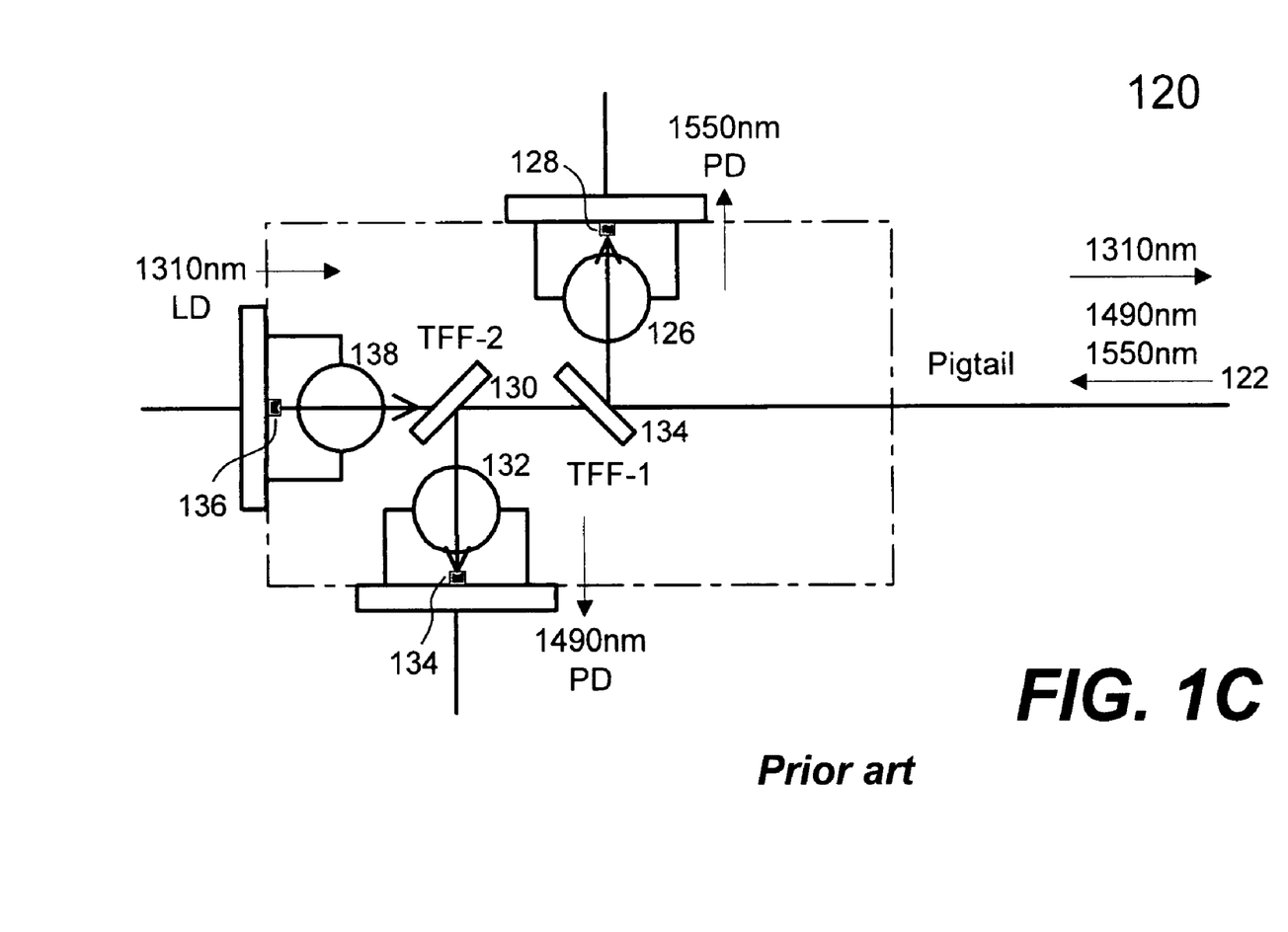
FIG. 1C shows an application of fiber-to-the-home (FTTH) using a three-port device.

FIG. 1C shows an application 120 of fiber-to-the-home (FTTH) using a three-port device. A downstream signal 122, namely a multiplexed signal carries essentially two individual light signals at wavelength 1490 nm and 1550 nm. The signal 122 is coupled from a pigtail fiber to a first thin film filter 124 that is configured to reflect a light signal at wavelength 1550 nm. When the signal 122 impinges upon the filter 124, the light signal at wavelength 1550 nm is thus redirected to a lens 126 that focuses the signal onto a laser sensitive component 128 (e.g., a photodiode). The laser sensitive component 128 converts the light signal to an electronic signal for further processing.

On the other hand, some of the signal 122 transmit through the filter 124 and essentially carries the light signal at wavelength 1490 nm. The 1490 nm signal impinges upon a second thin film filter 130 that is configured to reflect a light signal at wavelength 1490 nm. As a result, the 1490 nm signal is redirected to a lens 132 that focuses the signal onto a laser sensitive component 134 (e.g., a photodiode). The laser sensitive component 134 converts the light signal to an electronic signal for further processing.

At the same time, an upstream signal is at wavelength 1310 nm and emitted from a laser emitting device 136. The upstream signal is focused by a lens 118. As the wavelength of the upstream signal differs from the selected wavelength for the filter 124 or 130, the upstream signal thus goes through both of the filters 130 and 124 and is subsequently coupled to the pigtail fiber for transmission.

Figure 1D:
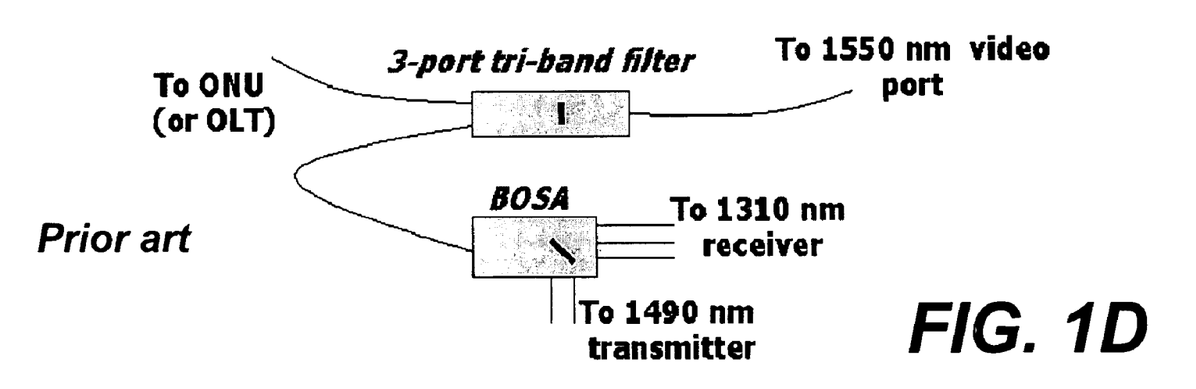
FIG. 1D is another representation of FIG. 1C, where it shows the use of one 3-port device (filter) together with a dual-band BOSA (bi-directional optical sub-assembly) to interface with three separate opto-electronic interfaces.
Figure 1E:
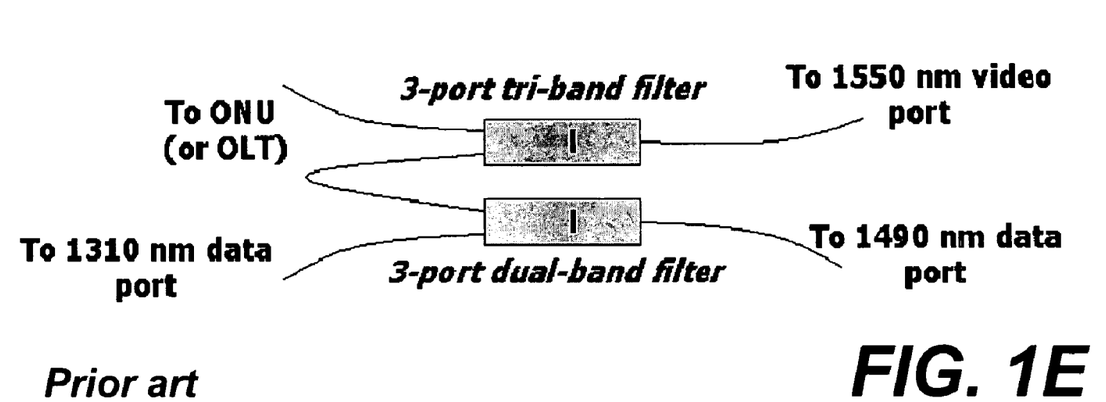
FIG. 1E shows a cascade of two 3-port devices (one triband and one dual-band) to offer a 4-port passive component to deal with the three interfaces

FIG. 1D is another representation of FIG. 1C, where it shows the use of one 3-port device (filter) together with a dual-band BOSA (bi-directional optical sub-assembly) to interface with three separate opto-electronic interfaces. FIG. 1E shows a cascade of two 3-port devices (one tri-band and one dual-band) to offer a 4-port passive component to deal with the three interfaces. While the approach A has a better integration structure, the approach B may offer overall better device optical performance and thereby can offer better overall signal quality.

The configuration in FIG. 1C, 1D or 1E operates based on the implementation 120. In principle, the implementation 120 works well in a bidirectional module for multichannel use to separate two or three multiplexed channel signals. However, a careful study of the implementation 120 reveals some problems in practical applications. One of the problems is the isolation between the two separated signals. It will be shown below that the separated signals interfere with each other. In other words, one signal carries a residual or a small portion of another signal. Another one of the problems is the efficiency of the separated signals. Because of the residual of one signal leaking into another, there is a loss to the signal, which can be significant when two signals are different in intensity.

It is well known that a frequency response of a thin film filter depends on an incident angle of a signal impinging upon the filter. When the incident angle is small, the frequency response of the thin film filter is maintained. When the incident angle is large, especially as large as 45° angle used in the implementation 120, the frequency response of the thin film filter is severely degraded. Noticeably, a slope region of the frequency response becomes substantially increased. The slope region, also referred to as a deadband, is the region between a stopband and a passband. In applications of separating channel signals or demultiplexing a multiplexed signal, the deadband is desirably as small as possible such that adjacent channel signals in proximity can still be cleanly separated.

For many fiber optic telecommunication applications, such as the fiber to the home (FTTH) application, as illustrated above, the wavelength separation between two channel signals (e.g., the 1550 nm signal and the 1490 nm signal) is often close to 50 nm. Using a uncooled laser for transmission for the purpose of reduced cost, the band separation of the two downstream signals can be as narrow as 30-40 nm. It consequently requires the deadband of a thin film filter no more than 30-50 nm. With an incident angle as large as 450, it is very difficult to the implementation 100 to achieve a desired separation of such two channel signals. When the channel signals can not be satisfactorily separated, interferences among channel signals could take place. In the implementation 100, the 1550 nm signal and the 1490 nm signal could interfere with each other. It may be worse when a weaker signal is interfered by a small portion of a stronger signal, sufficiently enough to cause distortions or unrecoverable loss of the weaker signal.

Accordingly, there is a great need for techniques for providing high isolation from the T-channel channel such that the errors or residuals to the R-channel are minimized. The devices so designed are amenable to small footprint, broad operating wavelength range, enhanced impact performance, lower cost, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for adding or dropping a selected wavelength or a group of wavelengths as well as multiplexing a plurality of signals into a multiplexed signal or demultiplexing a multiplexed signal into several signals. For simplicity, a group of selected wavelengths or channels will be deemed or described as a selected wavelength hereinafter. According to one aspect of the present invention, multiple optical filters are used to cause a reflected light beam to go through at least one more time an optical filter with band-pass spectrum to minimize residuals of other signals.

The present invention may be used in many areas such as optical communications and devices. For example, devices designed in accordance with the present invention can be used in applications of fiber to home, where in both the optical network unit (ONU) in a user end, as well as the optical line termination (OLT) in the network transmission end, high isolations between the high intensity video signal and the bi-directional downstream and upstream voice/data signals are highly demanded.

The present invention may be implemented in many ways as a subsystem, a device or a method. According to one embodiment, the present invention is an optical apparatus comprising a first optical filter configured to transmit a first selected wavelength and reflect all other wavelengths; a second optical filter the second optical filter configured to transmit a second selected wavelength and reflect all other wavelengths, and wherein the first optical filter, being not perfect and producing a reflected signal with a residual of a signal at the first selected wavelength, the residual of the signal is minimized by the second optical filter when the reflected signal is impinged upon the second optical filter.

According to another embodiment, the present invention is an optical apparatus comprising a first optical filter configured to transmit a first selected wavelength and reflect all other wavelengths, a plurality of second optical filters, each configured to transmit a selected wavelength and reflect all other wavelengths; each of the second optical filters being so positioned that, every time, a light beam impinges upon one of the second optical filters, residuals of the selected wavelength in the light beam are successively reduced to eventually produce a channel signal with much reduced residuals of the selected wavelength.

One of the objects, features, advantages of the present invention is to provide a mechanism of high isolation for the R-channel from the T-channel channel such that the errors or residuals to the R-channel are minimized. The devices so designed are amenable to small footprint, broad operating wavelength range, enhanced impact performance, lower cost, and easier manufacturing process.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The present invention pertains to new designs of optical devices particularly useful for adding or dropping a selected wavelength or a group of wavelengths as well as multiplexing a plurality of signals into a multiplexed signal or demultiplexing a multiplexed signal into several signals. One of the important features in the present invention is to provide a mechanism for high isolation of signals in one optical path from signals in another optical path. In particular, high isolation of the R-channel from the T-channel is provided in devices designed in accordance with the present invention to minimize errors or residuals of the T-channel in the R-channel signals.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 2A:
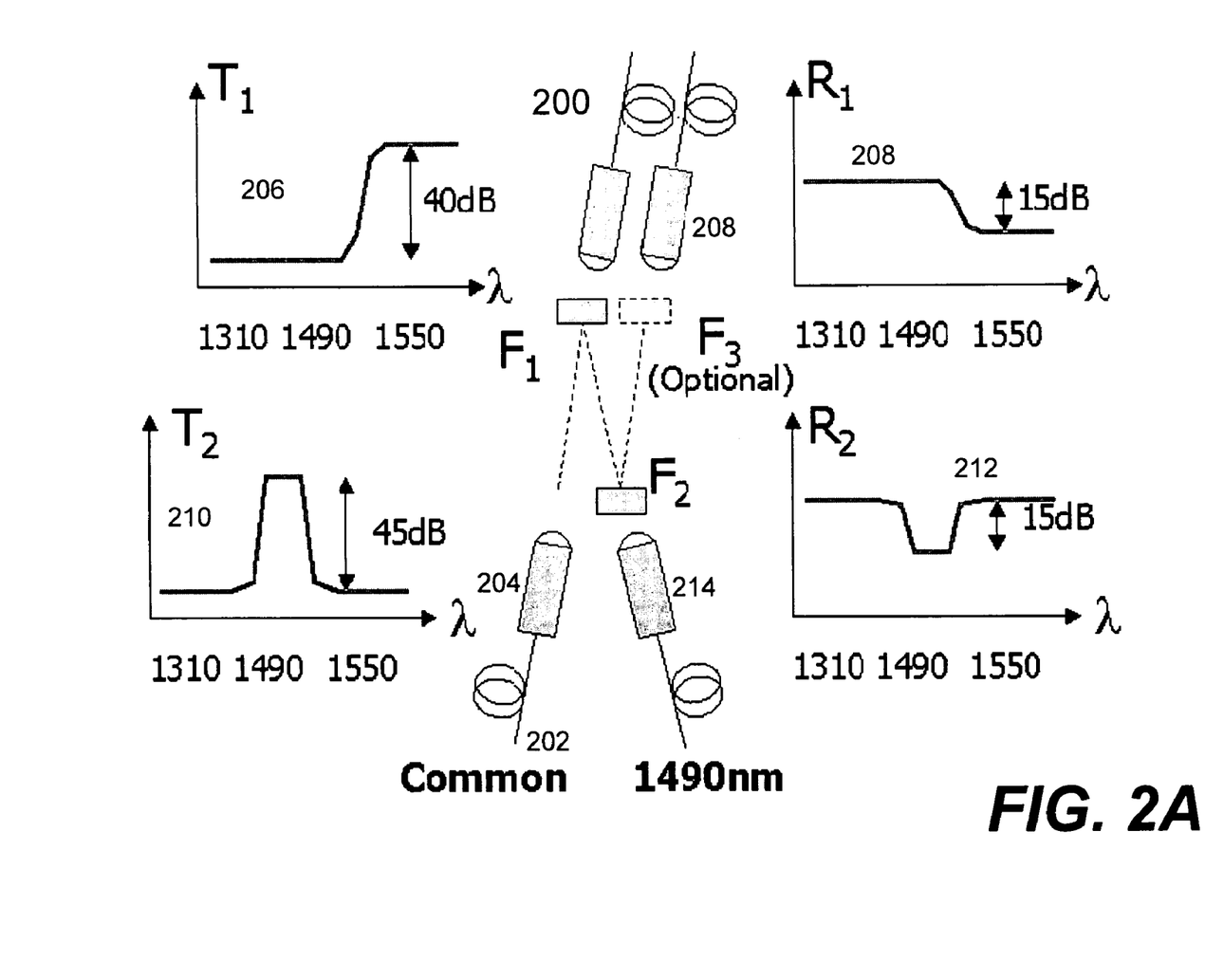
FIG. 2A shows an exemplary design of using multiple reflections to increase reflection channel isolation from the transmission channel.

Referring now to the drawings, in which like numerals refer to like parts throughout the several views. FIG. 2A shows an exemplary design 200 of using multiple reflections to increase reflection channel isolation from the transmission channel. It is assumed that a multiplexed signal is coupled to a common (C) port 202. To facilitate the explanation of the present invention, it is assumed that multiplexed signal carries at least two individual light signals at wavelength 1490 nm and 1550 nm. The multiplexed signal is focused by a collimator 204 onto a first filter F1.

As shown in the spectrum 206 and 208, the filter F1 has a transmission of 40 dB and a reflection of 15 dB for wavelengths greater than 1550 nm. Although the filter F1 is configured or made to transmit the wavelength 1550 nm and reflects all other wavelengths, the actual performance of the filter F1 reflects a portion of the 1550 nm signal. In other words, the reflected signal from the filter F1 carries some residual of the 1550 nm signal that, if not removed or minimized, may interfere signals at other wavelengths.

The reflected signal from the filter F1 now impinges onto the filter F2. As shown in 210 and 212, respectively, the filter F2 has a transmission of 45 dB and a reflection of 15 dB for the 1490 nm signal. Although not numerically shown in the reflection spectrum 212, the signals at other than the wavelength 1490 nm are significantly blocked. As a result, the residual of the 1550 nm signal in the reflected signal from the filter F1 is filtered out or minimized by the filter F2 while the 1490 nm signal transmits through the filter F2 to the collimator 214.

Similarly, the reflected signal from the filter F2 now carries some residual of the 1490 nm signal. Optionally, a third filter F3 may be placed before the collimator 216 to filter or minimize the residual of the 1490 nm signal from the reflected signal from the filter F2.

Figure 2B:
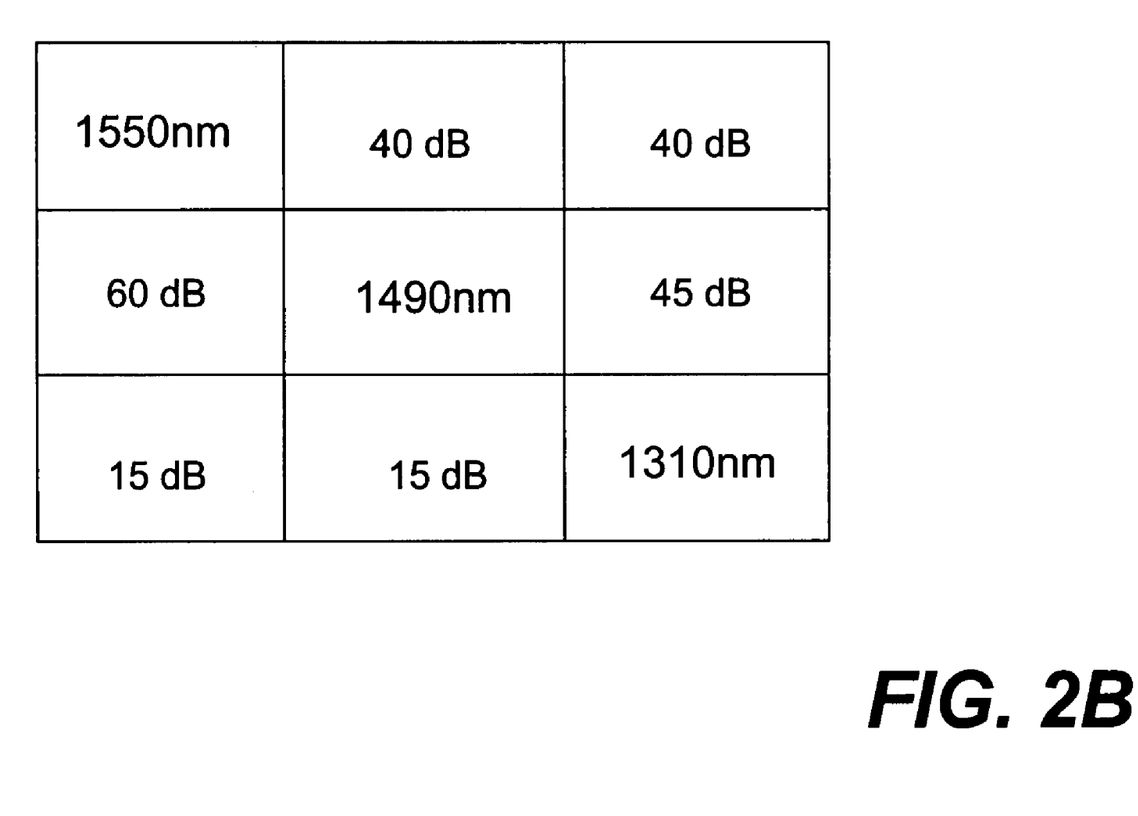
FIG. 2B shows a corresponding port isolation table in which the 1550 nm signal has been isolated significantly from the 1310 nm and 1490 nm signals while the 1490 nm signal is also isolated significantly from the 1310 nm signal.

It can be appreciated that one of the important features in the present invention is to cause a reflected signal to go through a band-pass filter that filters out or minimize any residual of the transmitted signals. In other words, the ports of an add/drop device are considerably isolated from each other. FIG. 2B shows a corresponding port isolation table in which the 1550 nm signal has been isolated significantly from the 1310 nm and 1490 nm signals while the 1490 nm signal is also isolated significantly from the 1310 nm signal.

Figure 3A:
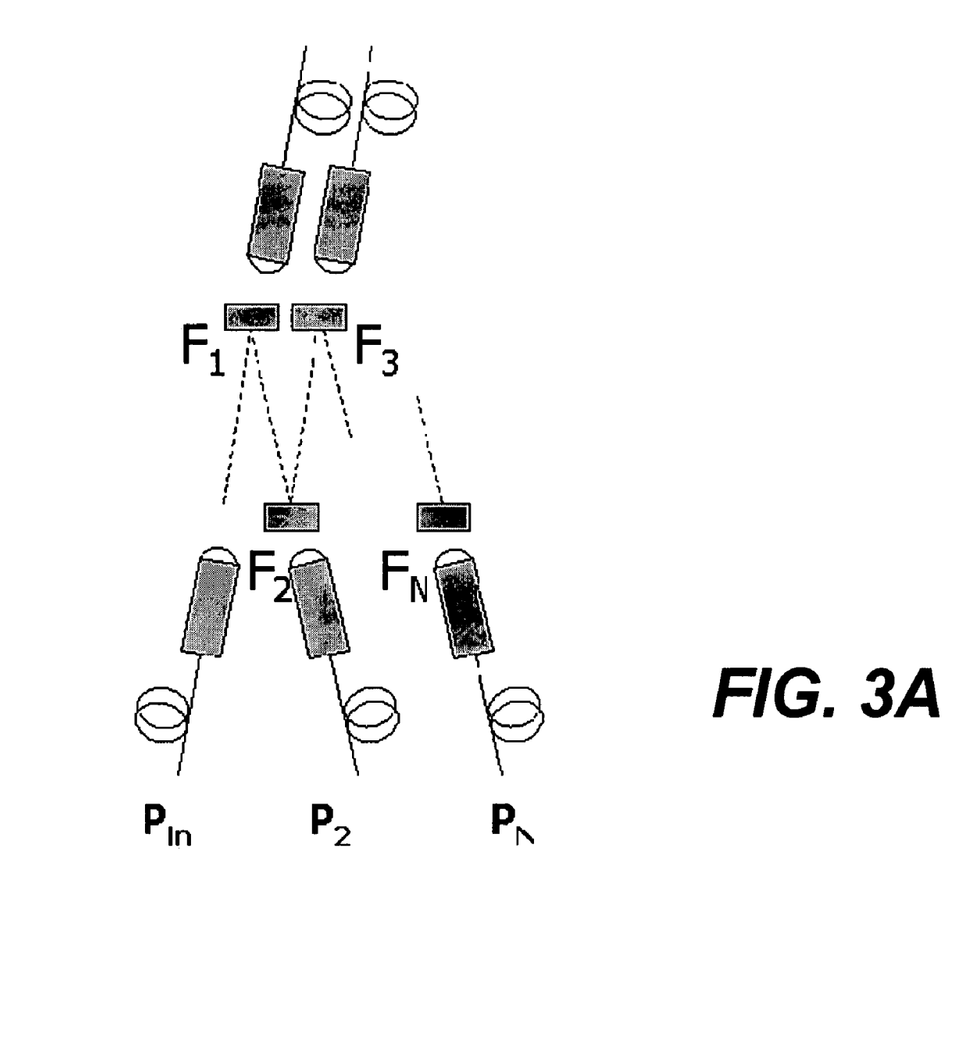
FIG. 3A shows an N-port device.

The four-port device 200 in FIG. 2A can be extended to an N-port device shown in FIG. 3A. Essentially, for an N-port device, at least N−2 filters may be used to filter out or minimize sequentially residuals of the transmitted signals from N−2 reflected signals. Optionally, an additional filter (corresponding to the filter F3 of FIG. 2A) may be used.

Figure 3B:
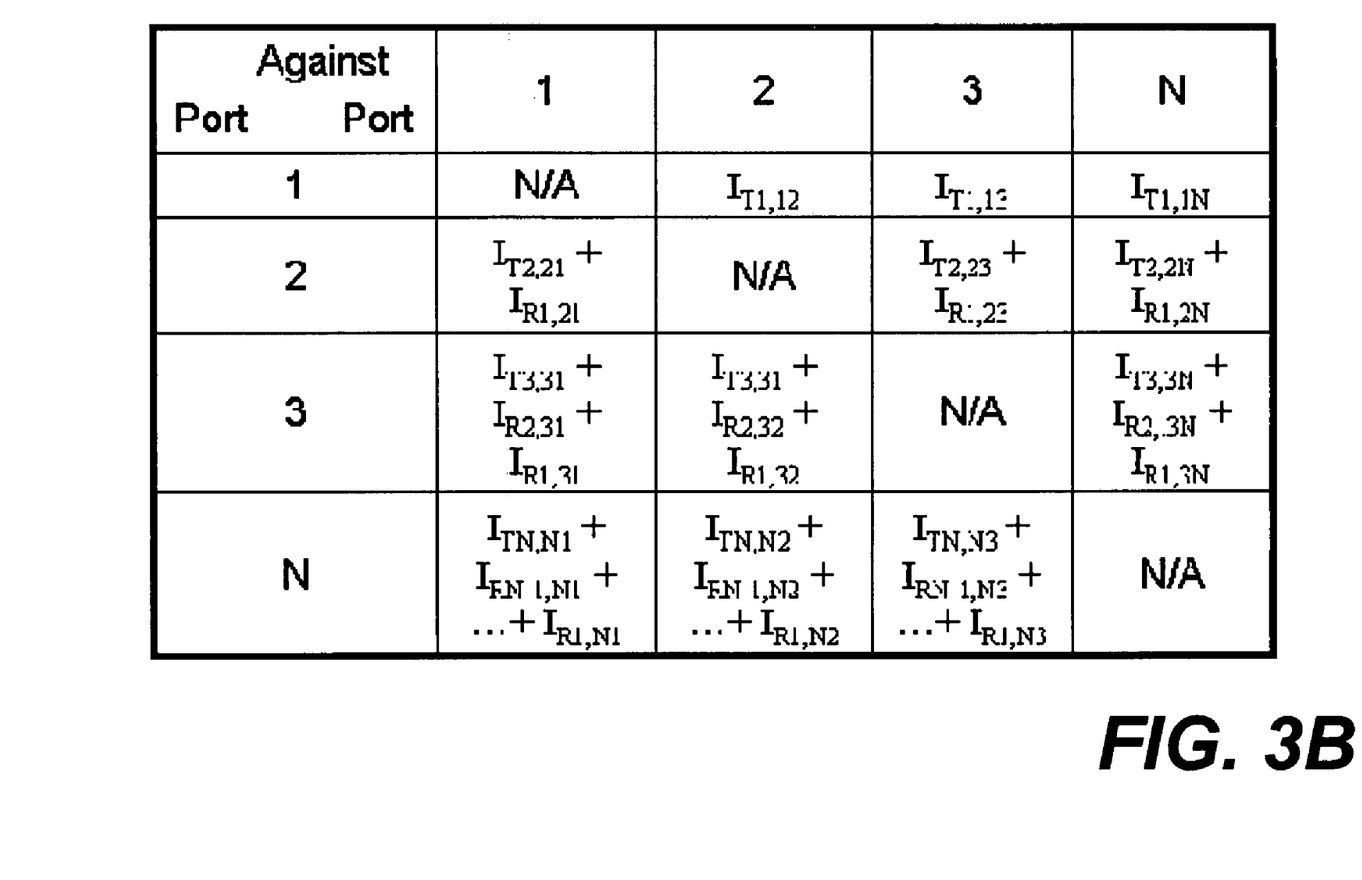
FIG. 3B shows a table summarizing the isolation of port i against port j (assuming each port has the spectrum with the same index).

To help calculate inter-band isolations among the N ports, the following notations are used: $Iso_{ij}$ denotes the optical isolation of port i against port j and $I_{T(R)I, ij}$ denotes the i-th filter's Transmission (or Reflection) spectrum isolation of band i against j. FIG. 3B shows a table summarizing the isolation of port i against port j (assuming each port has the spectrum with the same index). The results from the table may also be described mathematically by the following equation:

$$Iso_{ij} = I_{Ti,ij} + \sum_{k=1}^{i-1} I_{Rk,ij}$$

where $1 \leq i, j \leq N$

This is a generalized isolation relation for an N-port situation regardless one uses an edge (e.g., long-pass or short-pass) or a band-pass filter.

The present invention may be implemented in many ways, for example, as an apparatus, a system or a method and provides for adding/dropping or multiplexing/demultiplexing one or more wavelengths or one or more band signals. While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. An optical apparatus comprising:
a first optical filter being a high-pass filter to transmit most of a signal at a first selected wavelength and above while reflecting most of all signals at other wavelengths below the first selected wavelength in addition to a small amount of the signal of the first selected wavelength;
a second optical filter being a band-pass filter to transmit most of a signal at a second selected wavelength and reflect most of all other wavelengths above and below the second selected wavelength in addition to a percentile of the small amount of the signal of the first selected wavelength, and
wherein the first optical filter, being not perfect and producing the small amount of the signal as a residual of the signal at the first selected wavelength, the residual is reduced once by the second optical filter when reflected signals from the first optical filter are impinged upon the second optical filter.

2. The optical apparatus of claim 1, further comprising a third optical filter being a band-pass filter to transmit most of a signal at a third selected wavelength and reflect most of all other wavelengths above and below the third selected wavelength in addition to another percentile of the percentile of the small amount of the signal of the first selected wavelength.

3. The optical apparatus of claim 1, further including a third optical filter positioned to receive a reflected signal from the second optical filter, wherein the third optical filter has a spectrum of transmitting a third selected wavelength and reflecting all other wavelengths.

4. The optical apparatus of claim 3, wherein the third optical filter minimizes any residuals from the first and second optical filters.

5. The optical apparatus of claim 4, further including an input collimator providing a light signal including all wavelengths, a first collimator, a second collimator and a third collimator, and wherein the first collimator is positioned to receive a transmitted signal from the first optical filter, the second collimator is positioned to receive a transmitted signal from the second optical filter, and the third collimator is positioned to receive a transmitted signal from the third optical filter.

6. The optical apparatus of claim 1, wherein the optical apparatus includes N ports, inter-band isolations among the N ports are determined by:

$$Iso_{ij} = I_{Ti,ij} + \sum_{k=1}^{i-1} I_{Rk,ij}$$

where $Iso_{ij}$ denotes an optical isolation of port i against port j and $I_{Ti, ij}$, or $I_{Ri, ij}$ denotes the i-th filter's Transmission (or Reflection) spectrum isolation of band i against j, $1 \leq i,j \leq N$.

7. An optical apparatus comprising:

a first optical filter being a high-pass filter to transmit most of a signal at a first selected wavelength and above while reflecting most of all signals at other wavelengths and below the first selected wavelength;

a plurality of second optical filters, each being a band-pass filter to transmit most of a signal at a selected wavelength and reflect most of all signals all wavelengths other than the selected wavelength; and each of the second optical filters being so positioned that, every time, a light beam impinges upon one of the second optical filters, residual of the selected wavelength of the one of the second optical filters is successively reduced to eventually produce a channel signal with much reduced residuals of the selected wavelengths.

8. The optical apparatus of claim 7, wherein the first optical filter is one of an edge or a band-pass filter, and each of the second optical filter is a band-pass filter.

* * * * *